(12) United States Patent
Zink

(10) Patent No.: US 7,775,928 B2
(45) Date of Patent: Aug. 17, 2010

(54) DIFFERENTIAL AND BEARING ARRANGEMENT

(75) Inventor: Frederick E. Zink, Capac, MI (US)

(73) Assignee: American Axle & Manufacturing, Inc., Detroit, MI (US)

(*) Notice: Subject to any disclaimer, the term of this patent is extended or adjusted under 35 U.S.C. 154(b) by 532 days.

(21) Appl. No.: 11/859,348

(22) Filed: Sep. 21, 2007

(65) Prior Publication Data

US 2009/0082162 A1  Mar. 26, 2009

(51) Int. Cl.
*F16H 48/06* (2006.01)

(52) U.S. Cl. ..................................... 475/230

(58) Field of Classification Search ............. 475/230, 475/246, 247
See application file for complete search history.

(56) References Cited

U.S. PATENT DOCUMENTS

| | | | |
|---|---|---|---|
| 783,168 A | 2/1905 | Baker | |
| 3,001,842 A | 9/1961 | Boyd | |
| 3,202,466 A | 8/1965 | Kaptur | |
| 3,310,999 A | 3/1967 | Griffith | |
| 4,793,211 A | 12/1988 | Schmidt | |
| 4,914,800 A | 4/1990 | Cook | |
| 5,269,731 A | 12/1993 | Scudder et al. | |
| 5,279,186 A | 1/1994 | Martin et al. | |
| 5,293,686 A | 3/1994 | Martin et al. | |
| 5,609,072 A | 3/1997 | Lequis et al. | |
| 5,697,677 A | 12/1997 | Ruppert, Jr. et al. | |
| 5,806,371 A | 9/1998 | Hibbler et al. | |
| 6,227,716 B1 | 5/2001 | Irwin | |
| 6,357,927 B1 | 3/2002 | Myers et al. | |
| 6,398,689 B1 | 6/2002 | Morse et al. | |
| 6,409,626 B1 | 6/2002 | Irwin | |
| 6,533,697 B2* | 3/2003 | Morse et al. ............... 475/230 |
| 6,692,398 B1 | 2/2004 | Sullivan | |
| 6,695,739 B2 | 2/2004 | Fett | |
| 6,705,965 B2 | 3/2004 | Sullivan | |
| 6,729,207 B2 | 5/2004 | Allmandinger et al. | |
| 6,837,821 B2* | 1/2005 | Teraoka et al. ............. 475/231 |
| 7,108,428 B2 | 9/2006 | Ason et al. | |
| 7,121,972 B2 | 10/2006 | Allmandinger et al. | |
| 7,155,827 B2 | 1/2007 | Stuart et al. | |
| 7,211,017 B2* | 5/2007 | Green et al. ................. 475/86 |
| 7,282,006 B2* | 10/2007 | Petruska et al. ............ 475/230 |
| 2005/0245342 A1 | 11/2005 | Pontanari et al. | |
| 2008/0020888 A1 | 1/2008 | Kearney | |

FOREIGN PATENT DOCUMENTS

| | | |
|---|---|---|
| JP | 09-229167 | 9/1997 |
| JP | 3388357 B2 | 3/2003 |
| JP | 2006-118709 A | 5/2006 |
| JP | 2007-162869 A | 6/2007 |

* cited by examiner

*Primary Examiner*—Ha D. Ho
(74) *Attorney, Agent, or Firm*—Harness, Dickey & Pierce, P.L.C.

(57) ABSTRACT

An axle assembly with an axle housing with a pair of bearing journals, a differential assembly disposed between the bearing journals, a pair of differential bearings and a pair of hollow adjusters that can be threaded into the bearing journals to preload the differential bearings and control gear lash between a pinion and a ring gear. Retaining members can be non-rotatably engage to the hollow adjusters and can be press-fit into counterbores in the outboard sides of the bearing journals. The axle housing can include an unitarily formed differential housing with a body and an axle tube structure, and a first axle tube that can be discretely formed and coupled to the body.

17 Claims, 4 Drawing Sheets

DIFFERENTIAL AND BEARING ARRANGEMENT

INTRODUCTION

The present invention generally relates to axle assemblies. More particularly, the present invention relates to an axle assembly that can be packaged into a relatively narrow location and a related method for making an axle assembly.

Automotive drive axles can include an axle housing, a pair of axle shafts, an input pinion, and a differential assembly that can include a differential case, a ring gear mounted to the differential case, and a gearset that is disposed within the differential case. The differential case can be mounted in the axle housing for rotation about a first axis. The input pinion can be received by the axle housing for rotation about a second axis that is generally perpendicular to the first axis. The pinion can meshingly engage the ring gear.

In some situations, it may be difficult to fit or package an axle assembly into a vehicle due to the size of the axle housing. Accordingly, there remains a need in the art for an improved axle assembly that may be more easily packaged into a vehicle.

SUMMARY

In one form the present teachings provide a an axle assembly with an axle housing, a pinion, a differential assembly, a pair of first bearing portions, a pair of adjusters, a pair of second bearing portions and a pair of retaining members. The axle housing defining a pair of bearing journals and a pinion bore. The differential bearing journals having a threaded bore formed therethrough that is generally perpendicular to the pinion bore. Each one of the differential bearing journals having an outboard side opposite the other one of the differential bearing journals and a counterbore that is concentric with the threaded bore is formed in each of the outboard sides. The pinion is rotatably mounted in the pinion bore. The differential assembly has a differential case, a gearset received in the differential case, and a ring gear meshingly engaged to the pinion. The differential case includes a pair of bearing mounts. The differential bearings having a first bearing portion and second bearing portion. Each first bearing portion being coupled to an associated one of the bearing mounts and including a first bearing race and a set of bearing members that are mounted on a respective one of the first bearing races. The hollow adjusters having a threaded body portion and an adjustment portion. Each of the hollow adjusters being coupled to the axle housing such that its threaded body portion is threadably engaged to the threaded bore of an associated one of the differential bearing journals. The adjustment portions having a non-circular feature that is configured to be engaged by a tool for rotating the hollow adjusters. Each second bearing portion having a second bearing race that is disposed between one of the hollow adjusters and an associated one of the sets of bearing members. Each retaining member being received on an associated one of the hollow adjusters and engaging the non-circular feature to inhibit relative rotation therebetween. Each of the retaining members being press-fit into an associated one of the counterbores to inhibit relative rotation between the retaining members and the axle housing.

In another form the present teachings provide an axle assembly that includes an axle housing, a pinion, a differential assembly, a pair of first bearing portions, a pair of hollow adjusters, a pair of second bearing portions and a pair of retaining members. The axle housing has a differential housing, a first axle tube and a second axle tube. The differential housing defines a pair of bearing journals and a pinion bore. The differential bearing journals are integrally formed with the differential housing and are non-separable from a remainder of the differential housing. The differential bearing journals having a threaded bore formed therethrough that is generally perpendicular to the pinion bore. The first axle tube is separately formed and removably coupled to the differential housing. The second axle tube is integrally formed with the differential housing and is shorter than the first axle tube. The pinion is rotatably mounted in the pinion bore. The differential assembly having a differential case, a gearset received in the differential case, and a ring gear meshingly engaged to the pinion. The differential case includes a pair of bearing mounts. Each of the first bearing portions is coupled to an associated one of the bearing mounts and includes a first bearing race and a set of bearing members that are mounted on a respective one of the first bearing races. The hollow adjusters have a threaded body portion and an adjustment portion. Each of the hollow adjusters is coupled to the axle housing such that its threaded body portion is threadably engaged to the threaded bore of an associated one of the differential bearing journals. Each second bearing portion has a second bearing race that is press-fit to one of the hollow adjusters and the second bearing portions are disposed between the hollow adjusters the sets of bearing members. The retaining members are received on the hollow adjusters and engage the non-circular feature to inhibit relative rotation between the axle housing and the hollow adjusters.

In yet another form the present teachings provide a method for assembling an axle assembly. The method includes: providing a differential housing with a pair of differential bearing journals; installing a pinion into the differential housing; positioning a differential assembly between the differential bearing journals; threading a hollow adjuster into each of the differential bearing journals; installing a retaining member over each of the hollow adjusters, each retaining member engaging a non-circular feature on a respective one of the hollow adjusters; and pressing each of the retaining members into a counterbore formed on an associated one of the differential bearing journals, the retaining members engaging the differential housing to inhibit relative rotation therebetween.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION OF THE VARIOUS EMBODIMENTS

Figure 1:
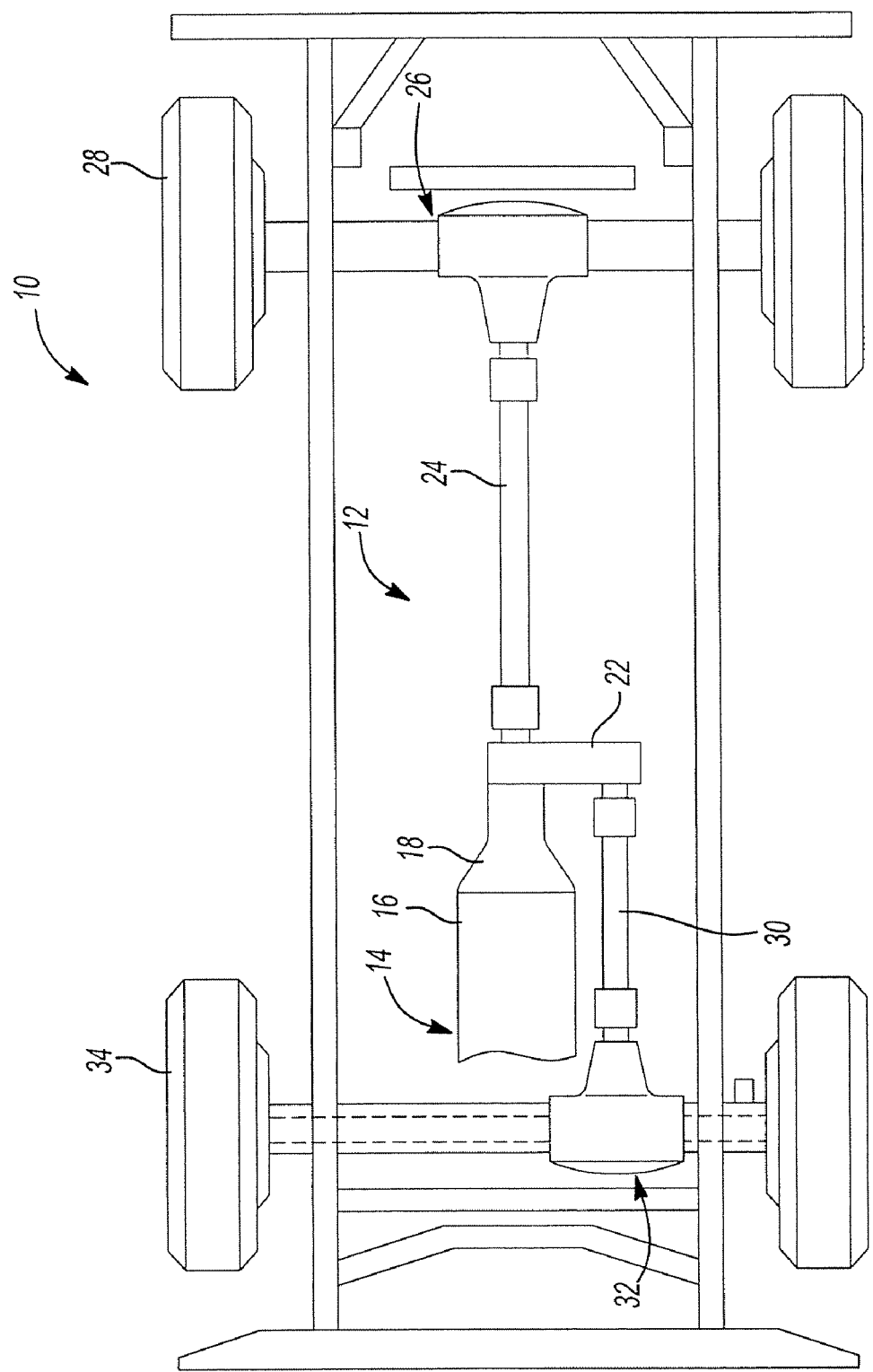
FIG. 1 is a schematic illustration of a vehicle having an axle assembly (i.e., a front axle assembly) constructed in accordance with the teachings of the present disclosure.

With reference to FIG. 1 of the drawings, a vehicle having an axle assembly (i.e., front axle assembly 32) constructed in accordance with the teachings of the present disclosure is generally indicated by reference numeral 10. The vehicle 10 can include a driveline 12 that is powered (i.e., driven) by a power train 14. The power train 14 can include an engine 16 and a transmission 18. The driveline 12 can include a transfer case 22 or other power distributing device, a rear propshaft 24, a rear axle assembly 26, a plurality of rear wheels 28, a front propshaft 30, a front axle assembly 32 and a pair of front wheels 34. The engine 16 can be mounted in an in-line or longitudinal orientation along the longitudinal axis of the vehicle 10 and its output can be coupled to the input of the transmission 18 in a conventional manner to transmit rotary power (i.e., drive torque) therebetween. The transmission 18 can include an output and a gear reduction unit that can be employed to couple the transmission input to the transmission output at a selected gear or speed ratio.

The transfer case 22 can be a conventional transfer case and can be coupled to the transmission 18 configured to transmit rotary power to the rear axle assembly 26 and the front axle assembly 32 in a desired manner. For example, the transfer case 22 can be operable in a first mode in which rotary power is transmitted only to the rear axle assembly 26 and in a second mode in which drive torque is allocated between the rear and front axle assemblies 26 and 32 in a predetermined manner.

The rear propshaft 24 is conventional and couples a rear output of the transfer case 22 to an input of the rear axle assembly 26, which is also conventional. The rear wheels 28 are coupled to and driven by the rear axle assembly 26 in a conventional manner. The front propshaft 30 is conventional and couples a front output of the transfer case 22 to the front axle assembly 32. The front wheels 34 are coupled to and driven by the front axle assembly 32.

Figure 2:
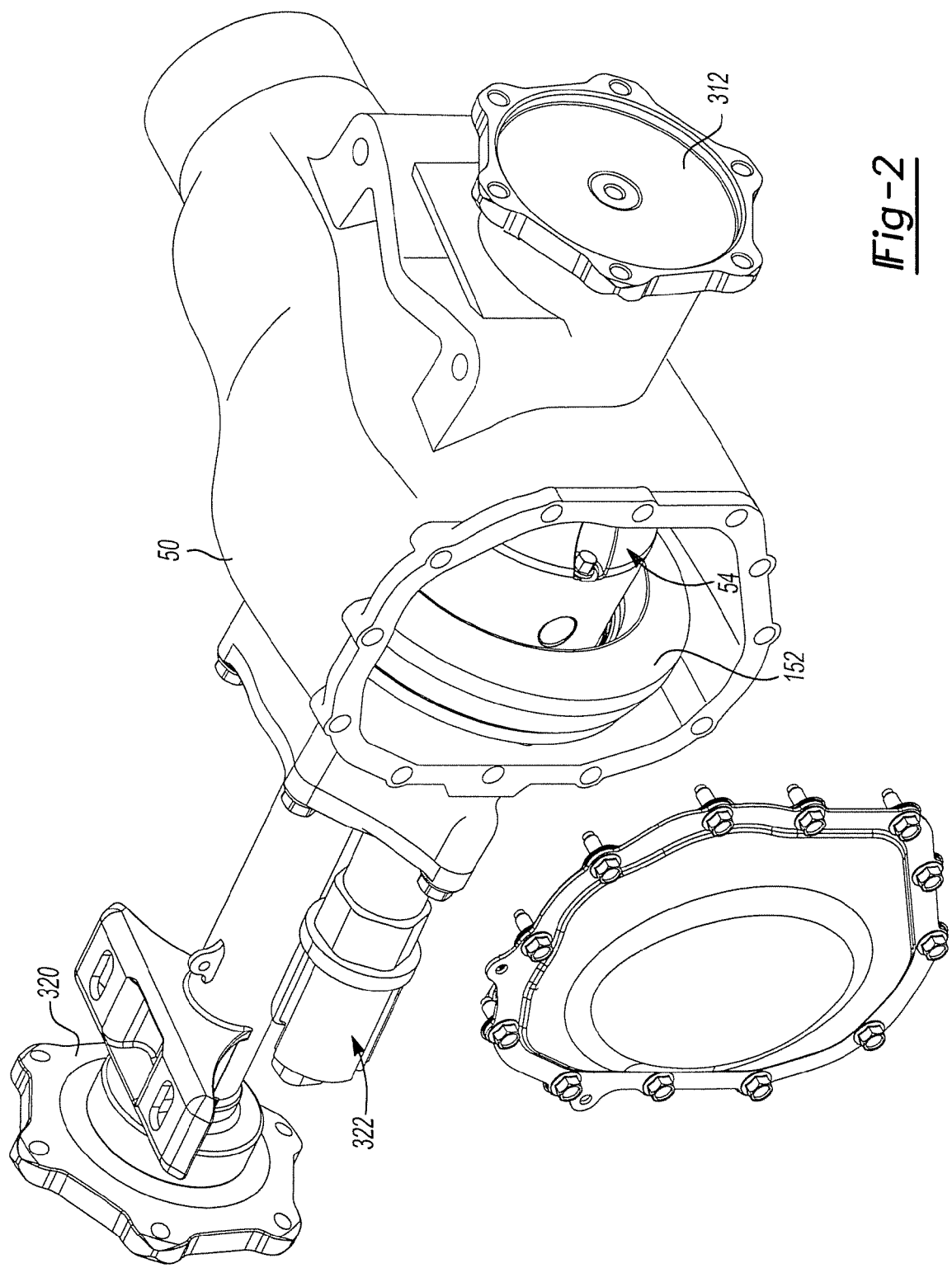
FIG. 2 is a rear exploded view of a portion of the vehicle of FIG. 1 illustrating the front axle assembly in more detail.
Figure 3:
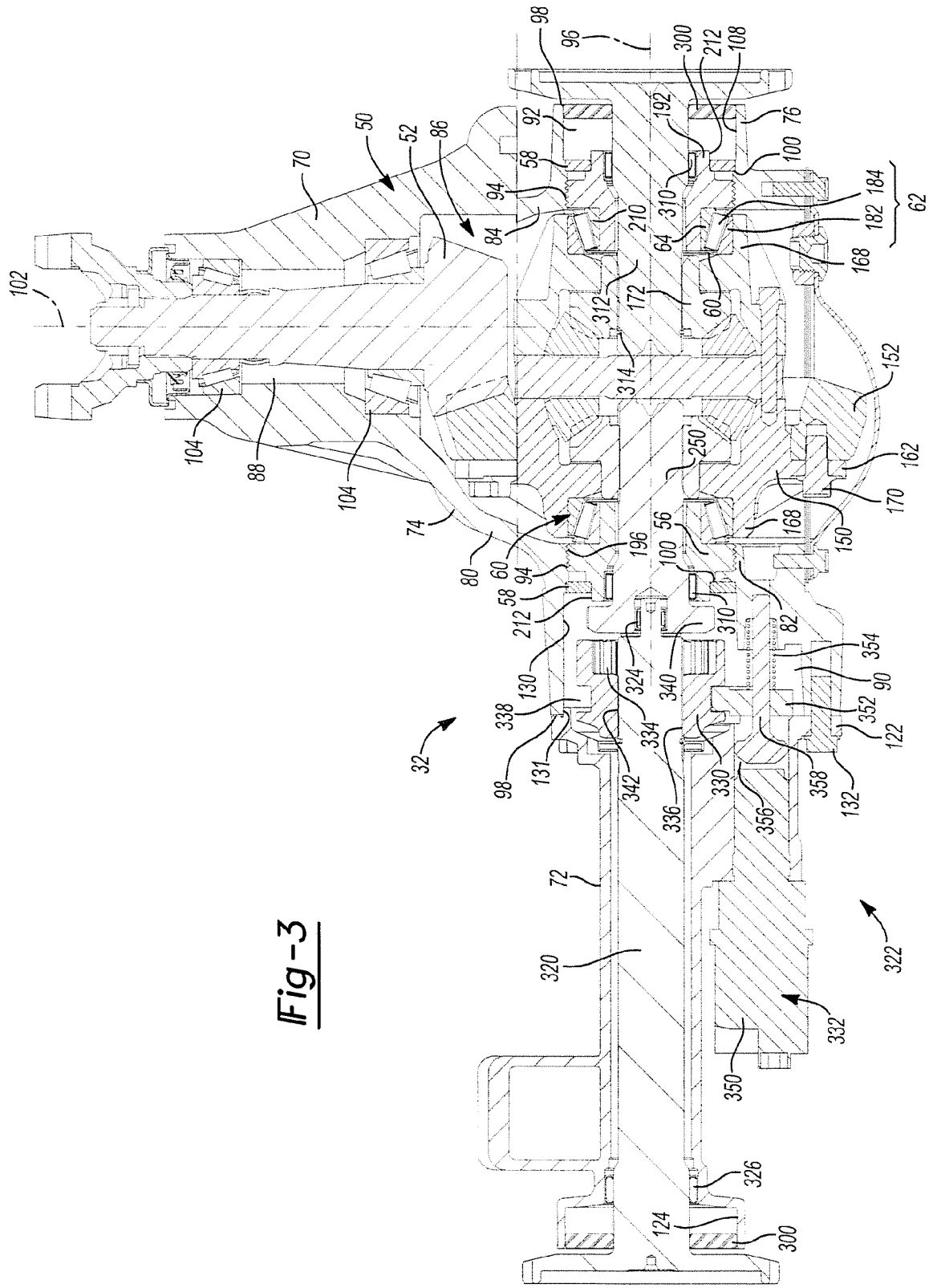
FIG. 3 is a sectional view of the front axle taken longitudinally along the rotational axis of the differential.
Figure 4:
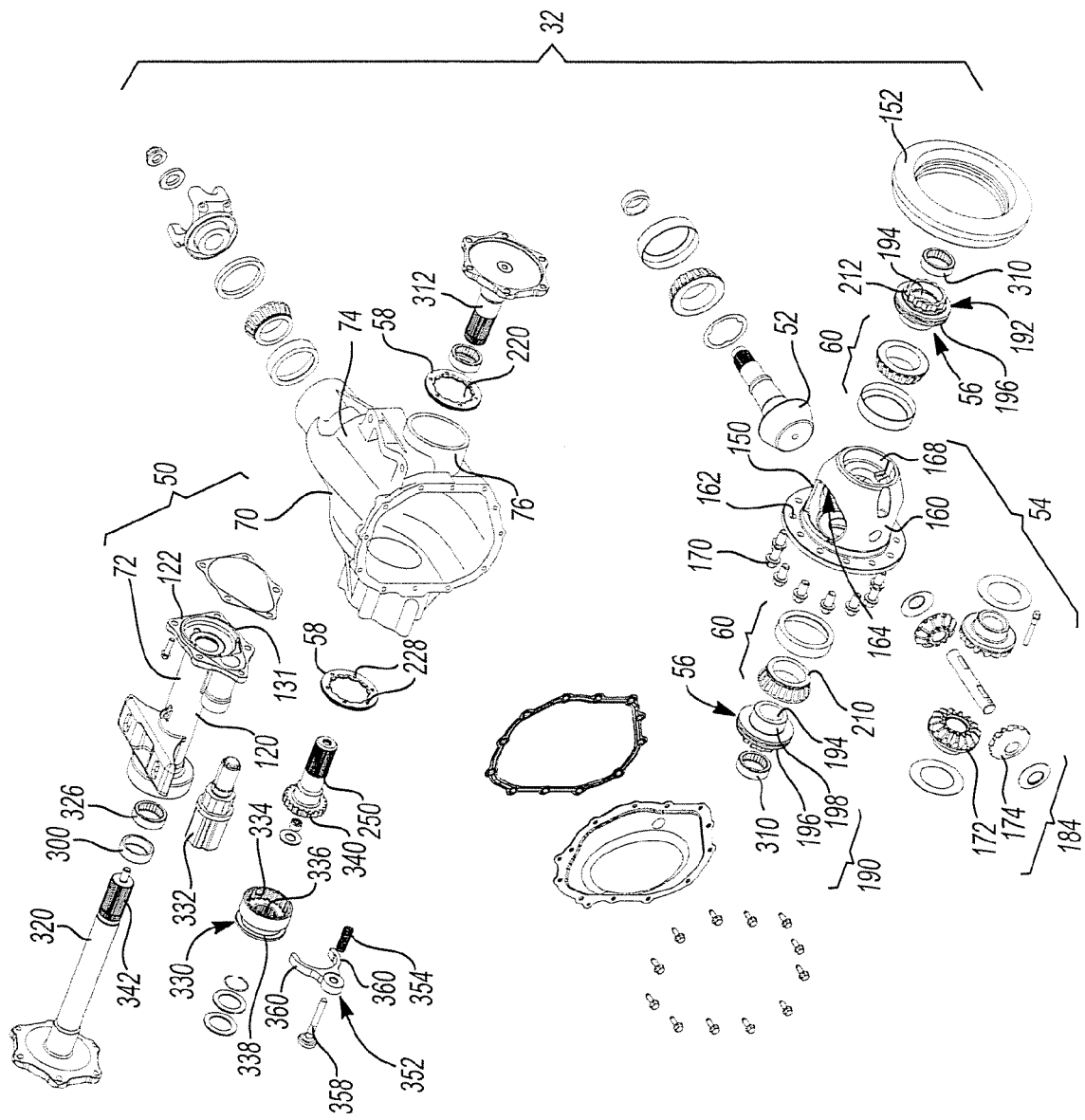
FIG. 4 is an exploded perspective view of the front axle assembly.

With reference to FIGS. 2 through 4, the front axle assembly 32 can include an axle housing 50, a pinion 52, a differential assembly 54, a pair of adjusters 56, a pair of retaining members 58 and a pair of differential bearings 60, each of which having a first bearing portion 62 and a second bearing portion 64. The axle housing 50 can include a differential housing 70 and a first axle tube 72. The differential housing 70 can include a body portion 74 and a second axle tube or axle tube portion 76.

With specific reference to FIGS. 3 and 4, the body portion 74 can include a wall member 80, a first bearing journal 82 and a second bearing journal 84. The wall member 80 can define a cavity 86 as well as a pinion bore 88 and an axle shaft aperture 90. The axle tube portion 76 can be integrally formed with the wall member 80 and can define an axle tube bore 92 that can be arranged about the axis of the axle shaft aperture 90. The first and second bearing journals 82 and 84 can be disposed in the cavity 86 inwardly of the wall member 80 and can be integrally formed with and non-removably coupled to the wall member 80. A threaded bore 94 can be formed through the first and second bearing journals 82 and 84 about a first axis 96. The first axis 96 can be coincident with the axes of the axle shaft aperture 90 and the axle tube bore 92. Each of the first and second bearing journals 82 and 84 can include an outboard sidewall 98 that can be positioned on a side opposite the other one of the first and second bearing journals 82 and 84. A counterbore 100 can be formed into each of the outboard sidewalls 98 concentric with the threaded bore 94. In the particular example provided, the counterbore 100 is a circular in shape. The pinion bore 88 can be disposed about a second axis 102 that can be generally perpendicular to the first axis 96. The pinion 52 can be received in the pinion bore 88 and supported on bearings 104 for rotation about the second axis 102. The axle tube portion 76 can be a hollow-structure that can be integrally formed with the body portion 74. An end of the axle tube portion 76 opposite the body portion 74 can define a seal bore 108.

The first axle tube 72 can include a hollow tube portion 120 and a flange member 122 that can extend about the tube portion 120. A seal bore 124 can be formed in an end of the tube portion 120 opposite the flange member 122. The flange member 122 can be removably coupled to the body portion 74 in a manner that aligns the hollow interior of the first axle tube 72 (including the seal bore 124) to the first axis 96. In the particular example provided, a counterbore 130 formed in the wall member 80 is sized to receive a lip 313 on the flange member 122; the lip 131 on the flange member 122 and the counterbore 130 are sized to align the first axle tube 72 to the first axis 96. Threaded fasteners 132 can be employed to fixedly but removably couple the flange member 122 to the wall member 80.

The differential assembly 54 can include a differential case 150, a ring gear 152, and a gear set 154. The differential case 150 can define a case body 160 and a case flange 162 that can extend radially outwardly from the case body 160. The case body 160 can define a case cavity 164, into which the gear set 154 is received, and a pair of first bearing mounts 168. The ring gear 152 can be coupled to the case flange 162 by any suitable means, such as laser welding or via a plurality of threaded fasteners 170. The gear set 154, which can include a pair of side gears 172 and a pair of pinion gears 174, can be received in the case cavity 164. The first bearing mounts 168 can be counterbores 180 that can be formed into the opposite sides of the differential case 150. The counterbores 180 can be sized to receive the first bearing portion 62, which can include a first bearing race 182, such as an outer bearing race, and a set of bearings 184, such as a set of rollers. The first bearing races 182 can be press-fit into the counterbores 180 prior to installation of the differential assembly 54 in the differential housing 70 between the first and second bearing journals 82 and 84.

Each adjuster 56 can include a body portion 190, an adjustment portion 192 and a longitudinally extending bore 194 that can be formed through the adjuster 56. The body portion 190 can include an externally threaded portion 196 and a second bearing mount 198. The threaded portion 192 is sized to be received in the threaded bore 94 and threadably engage an associated one of the first and second bearing journals 82 and 84. Each of the second bearing mounts 198 can be configured to receive a corresponding one of the second bearing portions 64. In the example provided, the second bearing mount 194 is a hollow shaft and the second bearing portion 64 includes a second bearing race 210, such as an inner bearing race, the can be press-fit onto the second bearing mount 198. The adjustment portion 192 can include a non-circular feature 212 that is configured to be engaged by a tool (not shown) to rotate the adjusters 56 to both preload the differential bearings 60, as well as to set the lash between the pinion 52 and the ring gear 152 and/or a desired gear tooth contact pattern. For example, the non-circular feature 212 can be a male feature that is sized to be engaged by a 12-point socket for a socket wrench (i.e., a socket having a 12 sided or double-hex interior cavity). As those of skill in the art will appreciate, a 12-point socket can be employed to engage various types of non-circular male features, including those having four, six or twelve equal sides. In the particular example provided, the non-circular feature 212 is a male 12-point structure (i.e., a male structure having 12 equal sides).

The retaining members 58 can be configured to inhibit relative rotation between the adjusters 56 and the differential housing 70. The retaining members 58 can be formed of any suitable material, such as a powdered metal material or a sheet or plate material, and have a circular shape with a 12-point (i.e., 12-sided or double hex) hole 220 in its center. The 12-point hole 220 is configured to engage the non-circular feature 212 on the adjustment portion 192 of the adjuster 56, while the outer diameter of the retaining members 58 are sized to engage (via an interference fit, such as a press-fit) the counterbores 100 in the first and second bearing journals 82 and 84. It will be appreciated that as the retaining members 58 are not "keyed" to the differential housing 70, the retaining members 58 can accommodate any orientation of the non-circular feature 212 relative to the differential housing 70. To accommodate the disassembly of the front axle assembly 32, the retaining members 58 can include one or more removal apertures 228 that can be sized to receive a tool (not shown) that can be employed to remove the retaining members 58 from the counterbores 100. The removal aperture 228 can be sized to receive a removal tool or a portion thereof (such as a jaw) or could be threaded apertures to which the removal tool can be coupled.

The front axle assembly 32 can be assembled in part by installing the pinion 52 to the pinion bore 88 in the differential housing 70; positioning the differential assembly 54 (with the first bearing portions 62 coupled thereto) between the first and second bearing journals 82 and 84 such that the first bearing portions 62 are aligned with threaded bores 94 and the ring gear 152 is meshingly engaged to the pinion 52; inserting one of the adjusters 56 (with the second bearing portion 64 coupled thereto) through the axle shaft aperture 90 in the wall member 80 of the differential housing 70 and threadably engaging its threaded portion 192 to the threaded bore 94 in the first bearing journal 82; inserting the other one of the adjusters 56 (with the second bearing portion 64 coupled thereto) through the axle tube bore 92 in the axle tube portion 76 and threadably engaging its threaded portion 192 to the threaded bore 94 in the second bearing journal 84; rotating one or both of the adjusters 56 to preload the differential bearings 60; rotating a position of one or both of the adjusters 56 as necessary to set the lash between the pinion 52 and the ring gear 152 and/or a desired gear tooth contact pattern; engaging the retaining members 58 to the non-circular feature 212 on each of the adjusters 56; pressing each of the retaining members 58 into an associated one of the counterbores 100 such that the retaining member 58 non-rotatably engages the differential housing 70; installing a first axle shaft segment 250 through the axle shaft aperture 90 and the longitudinally extending bore 194 in the adjuster 56 that is located in the first bearing journal 82; coupling the first axle tube 72 to the differential housing 70; and installing axle shaft seals 300 into the first axle tube 72 and the axle tube portion 76. Optionally, bearings 310 can be installed into the longitudinally extending bore 194 in each of the adjusters 56 prior to the installation of the seals 300, such as prior to the installation of the adjusters 56 to the axle housing 50. A second axle shaft segment 312 can be received through the axle tube portion 76 and the longitudinally extending bore 194 in the adjuster 56 that is located in the second bearing journal 84. Each of the first and second axle shaft segments 250 and 312 can be coupled for rotation with a respective one of the side gears 172 (via a set of mating spline teeth) and a retaining ring 314 can be employed to inhibit movement of the second axle shaft segment 312 in a direction away from the side gear 172.

In the particular example provided, the front axle assembly 32 includes a third axle shaft segment 320 and a locking mechanism 322. The third axle shaft segment 320 is received in the first axle tube 72 and can be supported by bearings 324 and 326 that are received in the first axle shaft segment 250 and the first axle tube 72, respectively. The locking mechanism 322 can be employed to selectively couple the first and third axle shaft segments 250 and 320 for rotation with one another. The locking mechanism 322 can include a coupling ring 330 and an actuator 332 and can be housed in the first axle tube 72. The coupling ring 330 can include a plurality of internal teeth 334, a set of spline teeth 336 and an annular channel 338 that can extend about its circumference. The internal teeth 334 can be sized to matingly engage corresponding teeth 340 that are formed on an end of the first axle shaft segment 250. The set of spline teeth 336 can be matingly engaged to a set of mating spline teeth 342 that can be formed on the third axle shaft segment 320 to permit the coupling ring 330 to be non-rotatably but axially slidably coupled to the third axle shaft segment 320. The actuator 332 can be any type of actuator that can move the coupling ring 330 between a first position, in which the internal teeth 334 are axially spaced apart from the teeth 340 on the first axle shaft segment 250, and a second position in which the internal teeth 334 are meshingly engaged to the teeth 340 on the first axle shaft segment 250. In the example provided, the actuator 332 includes a solenoid 350, a shifting fork 352 and a return spring 354. The solenoid 350 can be received in a cavity 356 in the first axle tube housing 72 and can include a plunger 358 that can be coupled to the shifting fork 352. The shifting fork 352 can include a pair of tines 360 that can be received into the annular channel 338 in the coupling ring 330. The return spring 354 can be positioned to bias the shifting fork 352 in a predetermined direction. The locking mechanism 322 can be operated in a first condition to maintain the coupling ring 330 in the first position to thereby decouple the third axle shaft segment 320 from the differential assembly 54. The locking mechanism 322 can also be operated in a second condition (e.g., by operating the solenoid 350 to move the shifting fork 352 (via the plunger 358) so as to engage the internal teeth 334 of the coupling ring 330 to the teeth 340 of the first axle shaft segment 250.

While specific examples have been described in the specification and illustrated in the drawings, it will be understood by those of ordinary skill in the art that various changes may be made and equivalents may be substituted for elements thereof without departing from the scope of the present disclosure as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present disclosure not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed is:

1. An axle assembly comprising:

an axle housing defining a pair of bearing journals and a pinion bore, the differential bearing journals having a threaded bore formed therethrough that is generally perpendicular to the pinion bore, each one of the differential bearing journals having an outboard side opposite the other one of the differential bearing journals, a counterbore concentric with the threaded bore being formed in each of the outboard sides;

a pinion rotatably mounted in the pinion bore;

a differential assembly having a differential case, a gearset received in the differential case, and a ring gear meshingly engaged to the pinion, the differential case including a pair of bearing mounts;

a pair of first bearing portions each of which being coupled to an associated one of the bearing mounts and including a first bearing race and a set of bearing members that are mounted on a respective one of the first bearing races;

a pair of hollow adjusters having a threaded body portion and an adjustment portion, each of the hollow adjusters being coupled to the axle housing such that its threaded body portion is threadably engaged to the threaded bore of an associated one of the differential bearing journals, the adjustment portions having a non-circular feature that is adapted to be engaged by a tool for rotating the hollow adjusters;

a pair of second bearing portions each having a second bearing race that is disposed between one of the hollow adjusters and an associated one of the sets of bearing members; and a pair of retaining members, each retaining member being received on an associated one of the hollow adjusters and engaging the non-circular feature to inhibit relative rotation therebetween, each of the retaining members being press-fit into an associated one of the counterbores to inhibit relative rotation between the retaining members and the axle housing.

2. The axle assembly of claim 1, wherein the second bearing races are press-fit to the hollow adjusters.

3. The axle assembly of claim 1, wherein the non-circular feature is a male feature.

4. The axle assembly of claim 3, wherein the male feature is capable of being drivingly engaged by a 12 point socket wrench.

5. The axle assembly of claim 1, wherein the retaining members are formed of a material selected from a group consisting of sheet materials, plate materials, powdered metal materials and combinations thereof.

6. The axle assembly of claim 1, wherein the retaining members include a removal aperture that is adapted to receive a removal tool that is configured to remove the retaining members from the axle housing.

7. The axle assembly of claim 1, wherein the axle housing includes a differential housing and a first axle tube, the differential bearing journals being integrally formed with the differential housing, the first axle tube being separately formed and coupled to the differential housing.

8. The axle assembly of claim 7, wherein the first axle tube is removably coupled to the differential housing.

9. The axle assembly of claim 7, wherein the axle housing includes a second axle tube.

10. The axle assembly of claim 9, wherein the second axle tube is integrally formed with the differential housing.

11. The axle assembly of claim 10, wherein the second axle tube is shorter than the first axle tube.

12. The axle assembly of claim 10, further comprising a seal assembly received in the second axle tube, the seal assembly being larger in diameter than a respective one of the hollow adjusters that is received through the second axle tube.

13. The axle assembly of claim 1, wherein each of the differential bearing journals has a base portion and an integrally-formed, non-separable cap portion.

14. An axle assembly comprising:

an axle housing having a differential housing, a first axle tube and a second axle tube, the differential housing defining a pair of bearing journals and a pinion bore, the differential bearing journals being integrally formed with the differential housing and non-separable from a remainder of the differential housing, the differential bearing journals having a threaded bore formed therethrough that is generally perpendicular to the pinion bore, the first axle tube being separately formed and removably coupled to the differential housing, the second axle tube being integrally formed with the differential housing and shorter than the first axle tube a pinion rotatably mounted in the pinion bore;

a differential assembly having a differential case, a gearset received in the differential case, and a ring gear meshingly engaged to the pinion, the differential case including a pair of bearing mounts;

a pair of first bearing portions each of which being coupled to an associated one of the bearing mounts and including a first bearing race and a set of bearing members that are mounted on a respective one of the first bearing races;

a pair of hollow adjusters having a threaded body portion and an adjustment portion, each of the hollow adjusters being coupled to the axle housing such that its threaded body portion is threadably engaged to the threaded bore of an associated one of the differential bearing journals;

a pair of second bearing portions, each second bearing portion having a second bearing race that is press-fit to one of the hollow adjusters, the second bearing portions being disposed between the hollow adjusters the sets of bearing members; and a pair of retaining members are received on the hollow adjusters and engage the non-circular feature to inhibit relative rotation between the axle housing and the hollow adjusters.

15. The axle assembly of claim 14, wherein each one of the differential bearing journals has an outboard side opposite the other one of the differential bearing journals, and wherein a counterbore concentric with the threaded bore is formed in each of the outboard sides.

16. The axle assembly of claim 15, wherein the retaining members are press-fit into the counterbores in the differential bearing journals to inhibit relative rotation between the retaining members and the axle housing.

17. The axle assembly of claim 14, further comprising a first output member, a second output member and a locking mechanism, the first output member being coupled to a first output of the differential assembly, wherein the locking mechanism selectively couples the second output member to a second output of the differential assembly.

* * * * *